(12) United States Patent
Tasaki et al.

(10) Patent No.: US 11,691,109 B2
(45) Date of Patent: Jul. 4, 2023

(54) GAS SEPARATION MEMBRANE ELEMENT, GAS SEPARATION MEMBRANE MODULE AND GAS SEPARATION APPARATUS

(71) Applicant: SUMITOMO CHEMICAL COMPANY, LIMITED, Tokyo (JP)

(72) Inventors: Tsutomu Tasaki, Osaka (JP); Shinichi Furukawa, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 400 days.

(21) Appl. No.: 16/335,746

(22) PCT Filed: Mar. 13, 2018

(86) PCT No.: PCT/JP2018/009633
§ 371 (c)(1),
(2) Date: Mar. 22, 2019

(87) PCT Pub. No.: WO2018/168820
PCT Pub. Date: Sep. 20, 2018

(65) Prior Publication Data
US 2019/0247797 A1    Aug. 15, 2019

(30) Foreign Application Priority Data
Mar. 17, 2017   (JP) ................................. 2017-052939

(51) Int. Cl.
*B01D 53/22*      (2006.01)
*B01D 65/00*      (2006.01)
(Continued)

(52) U.S. Cl.
CPC ........... *B01D 65/003* (2013.01); *B01D 53/22* (2013.01); *B01D 63/10* (2013.01); *B01D 69/12* (2013.01);
(Continued)

(58) Field of Classification Search
CPC ...... B01D 69/12; B01D 63/10; B01D 65/003; B01D 53/22; B01D 2053/221; B01D 2313/04; B01D 71/40
See application file for complete search history.

(56) References Cited

U.S. PATENT DOCUMENTS 4,018,687 A * 4/1977 Zahour .................. B01D 35/30
                                                                    55/498
4,732,849 A * 3/1988 Seshimoto ............... C12Q 1/58
                                                                    422/423
(Continued)

FOREIGN PATENT DOCUMENTS

JP   58-166902 A   10/1983
JP   4-135631 A    5/1992
(Continued)

OTHER PUBLICATIONS

Aremco "Aremco-Bond 2310 Ultra High Strength Adhesive Now Available" 10 pgs. Mar. 26, 2013 <https://www.aremco.com/news-item/aremco-bond-2310-ultra-high-strength-adhesive-now-available/- (Year: 2013).*

(Continued)

*Primary Examiner* — Anthony R Shumate
(74) *Attorney, Agent, or Firm* — Sughrue Mion, PLLC

(57) ABSTRACT

The gas separation membrane element contains a gas separation membrane, and a sealing portion for preventing mixture of a source gas and a specific gas permeated through a gas separation membrane. The gas separation membrane has a first porous layer including a porous membrane, and a hydrophilic resin composition layer disposed on the first porous layer. The sealing portion is a region in which a cured material of a sealant penetrates in at least the first porous layer in the gas separation membrane, and a thermal expansion coefficient A of the sealing portion and a thermal expansion coefficient B of a material forming the first porous layer satisfy a relation (I):

$0.35 \leq A/B \leq 1.0$                                                         (I).

13 Claims, 3 Drawing Sheets

(51) Int. Cl.
*B01D 63/10* (2006.01)
*B01D 71/40* (2006.01)
*B01D 69/12* (2006.01)

(52) U.S. Cl.
CPC ........ *B01D 71/40* (2013.01); *B01D 2053/221* (2013.01); *B01D 2313/04* (2013.01)

(56) References Cited

U.S. PATENT DOCUMENTS

| | | | | |
|---|---|---|---|---|
| 5,131,927 | A * | 7/1992 | Bikson | B01D 67/0093 96/13 |
| 5,275,726 | A | 1/1994 | Feimer et al. | |
| 5,556,906 | A * | 9/1996 | Collins | C09J 5/04 524/463 |
| 5,723,047 | A * | 3/1998 | Turnbull | B01D 29/012 55/DIG. 39 |
| 6,402,156 | B1 * | 6/2002 | Schutz | H01M 8/0286 501/71 |
| 10,092,880 | B2 * | 10/2018 | Okubo | B01D 69/12 |
| 2004/0115412 | A1 * | 6/2004 | Baron | A61B 5/14532 428/214 |
| 2009/0246429 | A1 * | 10/2009 | Zaki | C08K 3/08 428/35.8 |
| 2010/0172946 | A1 * | 7/2010 | Song | A61K 9/7061 424/402 |
| 2011/0084013 | A1 * | 4/2011 | Lesan | B01D 63/12 210/232 |
| 2013/0097982 | A1 * | 4/2013 | Inui | B01D 46/54 55/495 |
| 2013/0138384 | A1 * | 5/2013 | Kong | B01D 69/141 73/31.06 |
| 2014/0208707 | A1 | 7/2014 | Teranishi et al. | |
| 2015/0136689 | A1 * | 5/2015 | Butters | B01D 63/066 277/626 |
| 2015/0336056 | A1 * | 11/2015 | Ouchi | B01D 71/46 422/211 |
| 2016/0023164 | A1 * | 1/2016 | Karode | B01D 53/227 96/8 |
| 2017/0056828 | A1 * | 3/2017 | Jessen | B01D 63/081 |
| 2018/0178166 | A1 * | 6/2018 | Okubo | B01D 69/12 |
| 2020/0129926 | A1 * | 4/2020 | Muse | C02F 1/4693 |
| 2021/0197130 | A1 * | 7/2021 | Kosar | B01D 65/003 |

FOREIGN PATENT DOCUMENTS

| | | |
|---|---|---|
| JP | 8-154564 A | 6/1994 |
| JP | 10-000341 A | 1/1998 |
| JP | 2001-300273 A | 10/2001 |
| JP | 2012-176345 A | 9/2012 |
| JP | 2013-542074 A | 11/2013 |
| JP | 2014-161746 A | 9/2014 |
| JP | 2015-024377 A | 2/2015 |
| JP | 2015-024394 A | 2/2015 |
| TW | 201709970 A | 3/2017 |
| WO | 2012/065016 A1 | 5/2012 |
| WO | 2013/054794 A1 | 4/2013 |
| WO | 2015049497 A1 | 4/2015 |
| WO | 2015049499 A1 | 4/2015 |
| WO | 2016/194833 A1 | 12/2016 |

OTHER PUBLICATIONS

Communication dated Mar. 26, 2019, from the Japanese Patent Office in counterpart application No. 2019-506030.
Communication dated Jun. 9, 2020, from the European Patent Office in European Application No. 18767205.0.
International Search Report for PCT/JP2018/009633 dated Jun. 5, 2018 (PCT/ISA/210).
Communication dated Mar. 10, 2021, issued by the Intellectual Property Office of Taiwan in application No. 107109082.
Communication dated Apr. 6, 2022 from the Korean Patent Office in Korean Application No. 10-2019-7008182.

* cited by examiner

GAS SEPARATION MEMBRANE ELEMENT, GAS SEPARATION MEMBRANE MODULE AND GAS SEPARATION APPARATUS

CROSS REFERENCE TO RELATED APPLICATIONS

This application is a National Stage of International Application No. PCT/JP2018/009633 filed Mar. 13, 2018, claiming priority based on Japanese Patent Application No. 2017-052939, filed Mar. 17, 2017.

TECHNICAL FIELD

The present invention relates to a gas separation membrane element, a gas separation membrane module, a gas separation apparatus, and a method for manufacturing a gas separation membrane element.

BACKGROUND ART

A membrane separation process of acid gas has recently attracted attention as a process for separating an acid gas such as carbon dioxide from synthetic gas, generated in a plant for producing hydrogen, urea, or the like, natural gas, or exhaust gas, because it can realize energy saving.

Hollow type, tubular type, plate-and-frame type, and spiral-wound type are known as a type of the gas separation membrane element including a gas separation membrane. For example, the spiral-wound gas separation membrane element has a wound body in which a gas separation membrane, a feed-side flow channel member, and a permeate-side flow channel member are rolled in a laminated state around a central tube having multiple holes. In the spiral-wound gas separation membrane element, in order to prevent mixture of a source gas and a permeate gas, separated from the source gas, a sealing portion where a sealant penetrates is formed in a peripheral part of the gas separation membrane. The gas separation membrane for separating the acid gas from the source gas has a separation function layer for separating acid gas on a porous layer having a porous membrane as a supporting layer, and thus when the gas separation membrane having such a structure is used for the spiral-wound gas separation membrane element, sealing portions where the sealant penetrates are formed in peripheral parts of (usually 3 sides) of the porous layer of the gas separation membrane.

PTL 1 discloses a sealing and fixing material for end parts used in a semipermeable membrane, and describes that an imidazole curable epoxy resin is used as the sealing and fixing material for the end parts. In PTL 2 that discloses a spiral-wound membrane element for separation, a high temperature epoxy is recited as an adhesive used in fabrication of the spiral-wound membrane element for separation.

CITATION LIST

Patent Literature

PTL 1: Japanese Patent Laying-Open No. 58-166902
PTL 2: Japanese Patent Laying-Open No. 06-154564

SUMMARY OF INVENTION

Technical Problem

In a plant for producing hydrogen, urea, or the like in which the application of a gas separation membrane is assumed, a gas membrane separation process is usually performed in a high temperature condition. The gas separation membrane element, accordingly, is repeatedly exposed to high temperature and ordinary temperature conditions accompanying the repetition of operation and stopping of the gas membrane separation process.

The present inventors have found that in a gas separation membrane element including a gas separation membrane, which has a hydrophilic resin composition layer, which is a separation function layer, on a porous layer, the temperature change generated by the operation and stopping of the gas membrane separation process, as described above, causes the reduction of an efficiency of gas separation.

An object of the present invention is to provide a gas separation membrane element, a gas separation membrane module, a gas separation apparatus, and a method for manufacturing a gas separation membrane element, which can suppress the reduction of the efficiency of gas separation even under a condition in which the temperature change repeatedly occurs by the repetition, for example, of the operation and stopping of the gas membrane separation process.

Solution to Problem

The present invention provides the following gas separation membrane element, gas separation membrane module, gas separation apparatus, and the method for manufacturing the gas separation membrane element.

[1] A gas separation membrane element which separates a specific gas from a source gas containing the specific gas, the gas separation membrane element including:
a gas separation membrane; and
a sealing portion for preventing mixture of the source gas and the specific gas permeated through the gas separation membrane,
the gas separation membrane including
a first porous layer including a porous membrane; and
a hydrophilic resin composition layer selectively permeating the specific gas contained in the source gas,
the hydrophilic resin composition layer being disposed on the first porous layer,
the sealing portion being a region in which a cured material of a sealant penetrates at least the first porous layer,
a thermal expansion coefficient A of the sealing portion and a thermal expansion coefficient B of a material forming the first porous layer satisfying a relation (I):

$$0.35 \leq A/B \leq 1.0 \tag{I}$$

[2] The gas separation membrane element according to [1], wherein the thermal expansion coefficient A and the thermal expansion coefficient B satisfy a relation (i):

$$0.35 \leq A/B < 1.0 \tag{i}$$

[3] The gas separation membrane element according to [1] or [2], wherein the sealant is an epoxy-based resin.

[4] The gas separation membrane element according to any one of [1] to [3], wherein the material forming the first porous layer includes at least one kind of resin selected from the group consisting of polyethylene (PE), polypropylene (PP), a fluorine-containing resin, polystyrene (PS), polyethylene terephthalate (PET), polyether sulfone (PES), polyphenylene sulfide (PPS), polysulfone (PSF), polyimide (PI), polyetherimide (PEI), and polyether ether ketone (PEEK).

[5] The gas separation membrane element according to any one of [1] to [4], wherein
the gas separation membrane element is a spiral-wound gas separation membrane element further including:
a feed-side flow channel member to which the source gas is fed;
a permeate-side flow channel member in which the specific gas permeated through the gas separation membrane flows; and
a central tube in which the specific gas flowing in the permeate-side flow channel member is collected, and
the sealing portion is a region in which the cured material of the sealant penetrates in at least the permeate-side flow channel member and the first porous layer.

[6] The gas separation membrane element according to [5], wherein
the sealing portion is provided at least in end portions located at respective opposite ends of the gas separation membrane in a direction parallel with an axis of the central tube, and
the cured material of the sealant has a Shore hardness of 60 or more.

[7] The gas separation membrane element according to any one of [1] to [6], wherein
the hydrophilic resin composition layer includes
a hydrophilic resin, and
a carrier reversibly reacting with the specific gas in the source gas.

[8] The gas separation membrane element according to any one of [1] to [7], wherein
the specific gas is an acid gas.

[9] A gas separation membrane module including, in a housing, at least one gas separation membrane element as recited in any one of [1] to [8].

[10] A gas separation apparatus including at least one gas separation membrane module as recited in [9].

[11] A method for manufacturing a gas separation membrane element which separates a specific gas from a source gas containing the specific gas, the method including:
preparing a gas separation membrane including
a first porous layer including a porous membrane, and
a hydrophilic resin composition layer selectively permeating the specific gas contained in the source gas, the hydrophilic resin composition layer being disposed on the first porous layer; and
forming a sealing portion for preventing mixture of the source gas and the specific gas permeated through the gas separation membrane, by causing a sealant to be penetrated and cured in at least the first porous layer,
a thermal expansion coefficient A of the sealing portion and a thermal expansion coefficient B of a material forming the first porous layer satisfying a relation (I):

$$0.35 \leq A/B \leq 1.0 \tag{I}$$

[12] The method for manufacturing a gas separation membrane element according to [11], wherein the thermal expansion coefficient A and the thermal expansion coefficient B satisfy a relation (i):

$$0.35 \leq A/B < 1.0 \tag{i}$$

Advantageous Effects of Invention

The gas separation membrane element, separation membrane module, gas separation apparatus, and method for manufacturing a gas separation membrane element of the present invention can suppress the reduction of efficiency of gas separation even if it is used in a condition in which temperature change occurs repeatedly by repetition, for example, of operation and stopping of a gas membrane separation process.

DESCRIPTION OF EMBODIMENTS

Figure 1:
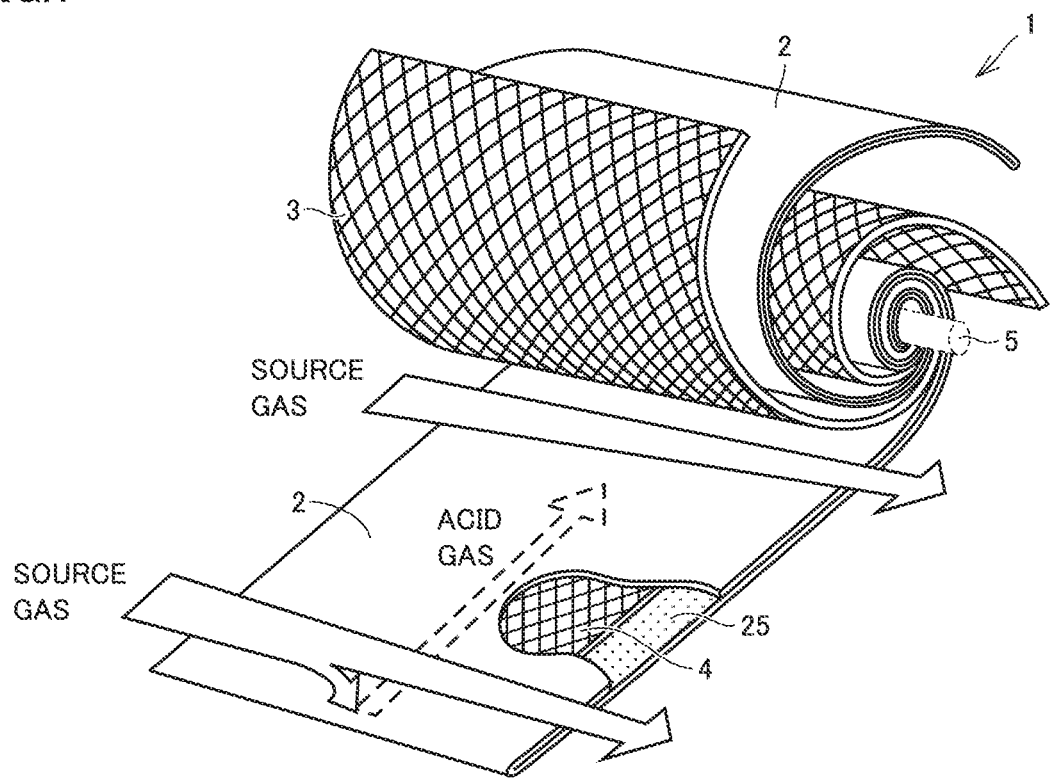
FIG. 1 is a development outline perspective view having a partially notched part, showing one example of a gas separation membrane element of the present invention.

Embodiments of the present invention are explained in detailed below. The present invention, however, is not limited thereto, and it is possible to make various alternations within a range described and embodiment obtained by combining technical means, each being described in a different embodiment, are within the technical scope of the present invention.

[Gas Separation Membrane Element]

The gas separation membrane element of the present invention is a gas separation membrane element which separates a specific gas from a source gas containing the specific gas, the gas separation membrane element including:
a gas separation membrane; and
a sealing portion for preventing mixture of the source gas and the specific gas permeated through the gas separation membrane,
the gas separation membrane including
a first porous layer including a porous membrane; and
a hydrophilic resin composition layer selectively permeating the specific gas contained in the source gas,
the hydrophilic resin composition layer being disposed on the first porous layer,
the sealing portion being a region in which a cured material of a sealant penetrates at least the first porous layer,
a thermal expansion coefficient A of the sealing portion and a thermal expansion coefficient B of a material forming the first porous layer satisfying a relation (I):

$$0.35 \leq A/B \leq 1.0 \tag{I}$$

The gas separation membrane element may include a spiral-wound type, a hollow-fiber type, a tubular type, and a plate-and-frame type elements. The gas separation membrane element is not particularly limited so long as, for example, a specific gas can be permeated and separated from a source gas containing multiple kinds of gases. The specific gas may include hydrogen, nitrogen, methane, an acid gas, and the like. The acid gas refers to a gas showing acidity, including carbon dioxide ($CO_2$), hydrogen sulfide ($H_2S$), carbonyl sulfide, sulfur oxide ($SO_x$), nitrogen oxide ($NO_x$), hydrogen halide such as hydrogen chloride, and the like.

The source gas refers to a gas fed to the gas separation membrane element. The source gas contains at least a specific gas. A permeate gas refers to a gas containing the specific gas, which has been permeated through the gas separation membrane in the gas separation membrane element. When the permeate gas is re-fed to the gas separation membrane element, the permeate gas may be a part of a source gas to be fed to the gas separation membrane element.

One embodiment of the present invention in which a spiral-wound gas separation membrane element is used as the gas separation membrane element, and the specific gas permeated through the gas separation membrane is an acid gas is explained below.

A spiral-wound acid gas separation membrane element (hereinafter which may be sometimes simply referred to as "gas separation membrane element") has:

a feed-side flow channel member in which a source gas containing an acid gas flows;

an acid gas separation membrane having a first porous layer containing a porous membrane, and hydrophilic resin composition layer being disposed on the first porous layer, and separating the acid gas contained in the source gas flowing in the feed-side flow channel member and causing permeation thereof;

a permeate-side flow channel member in which the permeate gas, which has been permeated through the acid gas separation membrane, flows;

a sealing portion for preventing mixture of the source gas and the permeate gas; and a central tube in which the permeate gas, flowing in the permeate-side flow channel member, is collected, a laminate in which the feed-side flow channel member, the acid gas separation membrane, and the permeate-side flow channel member are laminated being rolled around the central tube.

Figure 2:
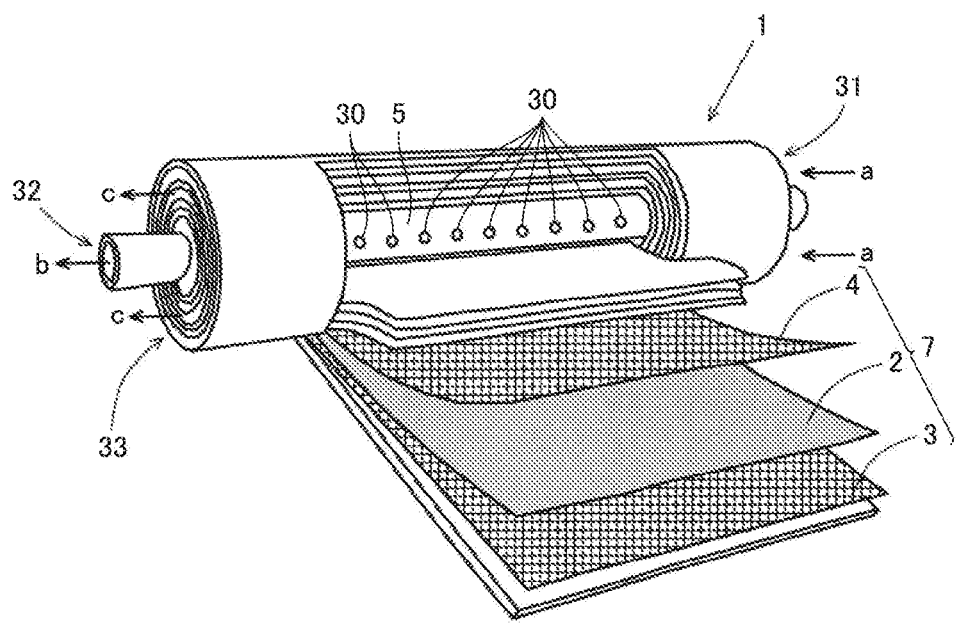
FIG. 2 is an outline perspective view having a partially developed part, showing one example of a gas separation membrane element of the present invention.
Figure 3:
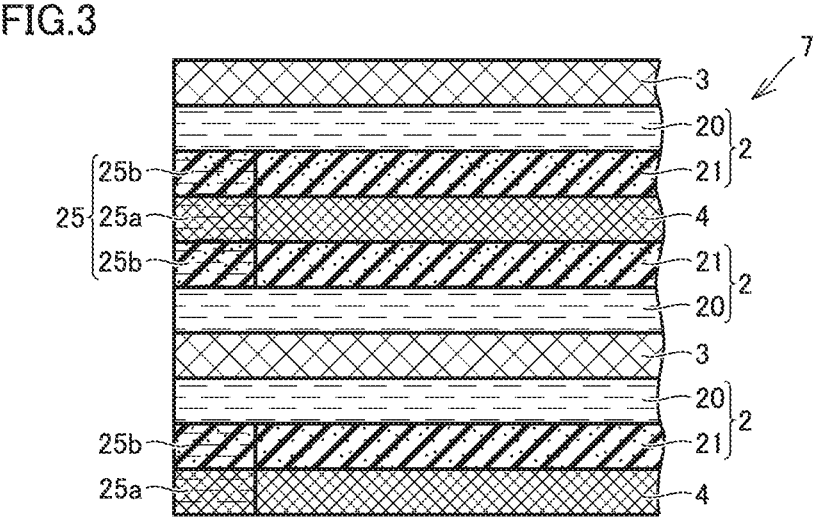
FIG. 3 is an outline cross-sectional view illustratively showing a part of a laminate forming a wound body of a gas separation membrane element of the present invention.

FIG. 1 is a development outline perspective view having a partially notched part, showing a spiral-wound gas separation membrane element 1. FIG. 2 is a development outline perspective view showing a part of spiral-wound gas separation membrane element 1. FIG. 3 is a cross-sectional view showing a part of a laminate forming a wound body of spiral-wound gas separation membrane element 1. The spiral-wound gas separation membrane element and the layer structure of the wound body, shown in FIGS. 1 to 3 are examples, and the present invention is not limited to these examples.

As shown in FIG. 1 and FIG. 2, gas separation membrane element 1 can have a wound body obtained by winding a laminate 7, in which at least one acid gas separation membrane 2, at least one feed-side flow channel member 3, and at least one permeate-side flow channel member 4 are laminated, around a central tube 5. The wound body may be in any shape such as a cylindrical or rectangular shape, and the cylindrical shape is preferable because it is housed in a cylindrical housing (container).

Gas separation membrane element 1 may further have a fixing member (not shown in drawings) such as a peripheral tape or an Anti-Telescope Device (ATD), in order to prevent unrolling or rolling collapse of the wound body, and an outer wrap (reinforcement layer) at the outermost periphery of the wound body, in order to secure the strength against loads caused by an internal pressure and external pressure applied to gas separation membrane element 1. The peripheral tape can suppress the unwinding of the wound body by rolling it around the periphery of the wound body. The anti-telescope device is attached to both end portions of the wound body, and can suppress the occurrence of rolling collapse (telescope) phenomenon on the wound body while gas separation membrane element 1 is used. As the outer wrap (reinforcement layer), for example, reinforcing materials such as a fiber-reinforced resin in which a glass fiber is impregnated with an epoxy resin can be used, and it is preferable that the epoxy resin is cured after the reinforcing material is rolled around the outermost periphery of the wound body.

[Wound Body]

The wound body forming gas separation membrane element 1, as shown in FIG. 3, can have laminate 7 in which permeate-side flow channel member 4, acid gas separation membrane 2, feed-side flow channel member 3, and acid gas separation membrane 2 are laminated repeatedly in this order in a direction from the central tube 5 side toward the periphery of the wound body, and a sealing portion 25 for preventing mixture of the source gas and the permeate gas. Acid gas separation membrane 2, as described below, contains at least a hydrophilic resin composition layer 20 selectively permeating an acid gas, and a first porous layer 21. First porous layer 21 is disposed for supporting hydrophilic resin composition layer 20 when the acid gas is separated from the source gas using acid gas separation membrane 2, and is disposed adjacent to hydrophilic resin composition layer 20. In acid gas separation membrane 2 shown in FIG. 3, an example in which first porous layer 21 supports hydrophilic resin composition layer 20, first porous layer 21 is disposed on a side of permeate-side flow channel member 4, and hydrophilic resin composition layer 20 is disposed on a side of feed-side flow channel member 3 is shown. Hereinafter, unless otherwise specifically noted, explanation is made referring to a case where first porous layer 21 is provided for supporting hydrophilic resin composition layer 20 as an example.

Acid gas separation membrane 2 may have a second porous layer (porous protective layer) containing a porous membrane on a surface opposite to a surface on which first porous layer 21 is disposed on hydrophilic resin composition layer 20. Acid gas separation membrane 2 may also have a third porous layer (porous supporting layer for reinforcement) containing a porous membrane on a surface opposite to a surface on which hydrophilic resin composition layer 20 is disposed on first porous layer 21 in acid gas separation membrane 2. For example, in acid gas separation membrane 2 shown in FIG. 3, the second porous layer is disposed between hydrophilic resin composition layer 20 and the feed-side flow channel member 3, and the third porous layer is disposed between first porous layer 21 and permeate-side flow channel member 4.

[Sealing Portion 25]

Sealing portion 25 is provided for preventing mixture of the source gas and the permeate gas, and in spiral-wound gas separation membrane element 1 shown in FIG. 1, the portion is a region in which a cured material of a sealant penetrates at least permeate-side flow channel member 4 and first porous layer 21 and can contain the cured material of sealant. The position of sealing portion 25 is not particularly limited so long as it is provided at a position capable of preventing the mixture of the source gas and the permeate gas. For example, it is possible to form the sealing portion having an envelope shape at end portions corresponding to both ends of acid gas separation membrane 2 in a direction parallel to an axis of central tube 5 of the wound body, and an end portion corresponding to an end portion located on the periphery side of the wound body among end portions corresponding to both ends of acid gas separation membrane 2 in a direction vertical to the axis of central tube 5, in permeate-side flow channel member 4 and first porous layer 21. The sealant contains a resin material, as described below, and sealing portion 25 is formed in a manner in which the sealant (resin material) penetrates permeate-side flow channel member 4 and first porous layer 21, and the sealant, which has penetrated, is cured. This can collect the permeate gas, permeated from feed-side flow channel member 3 through hydrophilic resin composition layer 20 in acid gas separation membrane 2 and fed to permeate-side flow channel member 4, in central tube 5.

Sealing portion 25, as shown in FIG. 3, can have a first sealing portion 25a, formed by penetration of the sealant into permeate-side flow channel member 4, and a second sealing portion 25b, formed by penetration of the sealant into first porous layer 21 in acid gas separation membrane 2. In a lamination structure part in which acid gas separation membranes 2 are provided on both surfaces of permeate-side flow channel member 4, sealing portion 25 is formed from one first sealing portion 25a and two second sealing portions 25b. In a case where laminate 7 has a porous third porous layer between first porous layer 21 in acid gas separation membrane 2 and permeate-side flow channel member 4, sealing portion 25 contains a third sealing portion formed by penetration of the sealant into the third porous layer.

A thermal expansion coefficient A of sealing portion 25 and a thermal expansion coefficient B of a material forming first porous layer 21 satisfy a relation (I), preferably by the following formula (i):

$$0.35 \leq A/B \leq 1.0 \quad (I)$$

$$0.35 \leq A/B < 1.0 \quad (i).$$

The ratio A/B is 0.35 or more, preferably 0.36 or more, more preferably 0.38 or more. The ratio is preferably 0.99 or less, more preferably 0.98 or less, still more preferably 0.96 or less. In a plant for producing hydrogen, urea, or the like, in which the application of gas separation membrane element 1 is assumed, gas separation membrane element 1 is exposed to high temperature and ordinary temperature conditions by operation and stopping of the gas membrane separation process. When the ratio A/B is within the range described above, even if acid gas separation membrane 2 is exposed to a condition with temperature change, as described above, the reduction of the separation efficiency of the acid gas by gas separation membrane element 1 can be suppressed. Gas separation membrane element 1 may also be exposed to a high temperature and high humidity condition, and when acid gas separation membrane 2 is exposed to the high temperature and high humidity condition, it is preferable that the ratio A/B satisfies a relation represented by the formula (i). When the ratio A/B satisfies the relation represented by the formula (i), the strength of sealing portion 25 can be improved in the high temperature and high humidity condition.

Thermal expansion coefficient A of sealing portion 25 is an average coefficient of linear expansion at a temperature of 25 to 35° C., obtained by forming a sample for measurement having a size of 10 mm×5 mm, obtained by cutting laminate 7 forming gas separation membrane element 1 so that second sealing portion 25b/first sealing portion 25a/second sealing portion 25b are contained, and measuring the sample using a Thermal Mechanical Analysis (TMA) measuring apparatus. The sample for measurement cut from sealing portion 25 may contain hydrophilic resin composition layer 20 on either or both second sealing portions 25b. Hydrophilic resin composition layer 20 is usually a thinner and softer material compared to sealing portion 25, and thus even if hydrophilic resin composition layer 20 is thermally expanded or thermally shrunk, it is considered that the sealing portion 25 is hardly influenced by the phenomenon. Sealing portion 25 has preferably a thermal expansion coefficient A of $25 \times 10^{-6}$ °C.$^{-1}$ or more, more preferably $30 \times 10^{-6}$ °C.$^{-1}$ or more, still more preferably $35 \times 10^{-6}$ °C.$^{-1}$ or more. It is also preferably $250 \times 10^{-6}$ °C.$^{-1}$ or less, more preferably $200 \times 10^{-6}$ °C.$^{-1}$ or less, still more preferably $150 \times 10^{-6}$ °C.$^{-1}$ or less.

When sealing portion 25 contains the third sealing portion, thermal expansion coefficient A of sealing portion 25 may be obtained by measuring a thermal expansion coefficient A of sealing portion 25 containing the third sealing portion. The value, accordingly, may be an average coefficient of linear expansion at a temperature of 25 to 35° C., obtained by forming a sample for measurement having a size of 10 mm×5 mm, obtained by cutting sealing portion 25 so that second sealing portion 25b/the third sealing portion/the first sealing portion 25a/the third sealing portion/second sealing portion 25b are contained, and measuring the sample using a TMA (Thermal Mechanical Analysis) measuring apparatus. The sample for measurement, cut from sealing portion 25, may contain hydrophilic resin composition layer 20 on either or both second sealing portions 25b.

Thermal expansion coefficient B of the material forming first porous layer 21 is an average coefficient of linear expansion at a temperature of 25 to 35° C., obtained by forming a sheet sample, obtained by heating first porous layer 21 to form a sheet and cutting into a size of 10 mm×5 mm, and measuring the sheet sample using Thermal Mechanical Analysis (TMA) measuring apparatus. The sheet sample is fabricated in a manner described in example described below. The material forming first porous layer 21 has preferably a thermal expansion coefficient B of $15 \times 10^{-6}$ °C.$^{-1}$ or more, more preferably $30 \times 10^{-6}$ °C.$^{-1}$ or more, still more preferably $40 \times 10^{-6}$ °C.$^{-1}$ or more. It is also preferably $300 \times 10^{-6}$ °C.$^{-1}$ or less, more preferably $250 \times 10^{-6}$ °C.$^{-1}$ or less, still more preferably $200 \times 10^{-6}$ °C.$^{-1}$ or less. When thermal expansion coefficient B is beyond the range described above, it tends to be difficult that hydrophilic resin composition layer 20 disposed on first porous layer 21 follows the thermal expansion or thermal shrinkage of first porous layer 21 in not only a region relatively close to sealing portion 25 but also a region relatively far from sealing portion 25. For that reason, damages such as pin holes or cracks may be easily generated throughout hydrophilic resin composition layer 20, as described below.

As for the reason in which the reduction of the separation efficiency of the acid gas in gas separation membrane element 1 can be suppressed by satisfying the relation represented by the formula (I), the present inventors assume as follows. When gas separation membrane element 1 is exposed to high temperature and ordinary temperature conditions, strains are generated in acid gas separation membrane 2 due to a difference between an extent of thermal expansion and thermal shrinkage caused on second sealing portion 25b in first porous layer 21 and an extent of thermal expansion and thermal shrinkage caused on a part where second sealing portion 25b in first porous layer 21 is not provided, when the temperature change occurs. The strains generated on acid gas separation membrane 2 generate damages such as pin holes and cracks on hydrophilic resin composition layer 20 on first porous layer 21; as a result, it is assumed that the separation efficiency of the acid gas is reduced by gas separation membrane element 1. It is assumed that the present inventors have made thermal expansion coefficient A of sealing portion 25 and thermal expansion coefficient B of the material forming first porous layer 21 to satisfy the relation defined by the formula (I) described above, whereby it is difficult that strains are generated on acid gas separation membrane 2 by the temperature change to suppress the occurrence of damages such as pin holes and cracks on hydrophilic resin composition layer 20; as a result, the reduction of the separation efficiency of the acid gas can be suppressed in gas separation membrane element 1.

[Sealant]

A sealant, used for forming sealing portion 25, is not particularly limited so long as it is a material which can penetrate permeate-side flow channel member 4 and first porous layer 21 and can form first sealing portion 25a and second sealing portion 25b. The sealant is preferably a material capable of sticking permeate-side flow channel member 4 to first porous layer 21. The sealants forming first sealing portion 25a and second sealing portion 25b may be the same or different, and it is preferable that they are the same in order to obtain good sticking tendency between first sealing portion 25a and second sealing portion 25b. The sealant may specifically include materials generally used as an adhesive, preferably materials having heat resistance and moisture resistance corresponding to temperature conditions, for example, when acid gas separation membrane 2 is used.

The sealant may include, for example, epoxy-based resins, vinyl chloride copolymer-based resins, vinyl chloride-vinyl acetate copolymer-based resins, vinyl chloride-vinylidene chloride copolymer-based resins, vinyl chloride-acrylonitrile copolymer-based resins, butadiene-acrylonitrile copolymer-based resins, polyamide-based resins, polyvinyl butyral-based resins, polyester-based resins, cellulose derivative (nitrocellulose, and the like)-based resins, styrene-butadiene copolymer-based resins, various synthetic rubber-based resins, phenol-based resins, urea-based resins, melamine-based resins, phenoxy-based resins, silicone-based resins, urea formamide-based resins, and the like. Of these, the epoxy-based resin (a resin for epoxy-based adhesive) is preferable. The epoxy-based resin may be a compound containing an epoxy group curable with an amine, acid anhydride, or the like, which may be a one-pack curable type or a two-pack mixing type in the terms of a curing mode, and may be a thermosetting type or a cold-curing type in the terms of a curing temperature. The sealant may contain an inorganic or organic filler, for the purpose of controlling the viscosity when used or improving the strength after curing, and may contain a curing catalyst if necessary.

When sealing portion 25 is provided at the end portions located at both ends of acid gas separation membrane 2 in a direction parallel to an axis of central tube 5, the cured material of the sealant forming sealing portion 25 has preferably a Shore hardness of 60 or more, more preferably 65 or more. Gas separation membrane element 1 may contain an anti-telescope device as described above, in order to suppress occurrence of a rolling collapse (telescope) phenomenon on the wound body. When the anti-telescope device is attached to the wound body, the both ends of the wound body are subjected to a cutting treatment in order to make the bottom face located at both ends in a direction parallel to the axis of the wound body flat. When the both ends of the wound body are cut, the wound body is deformed by pressing a knife to the wound body to generate damages on hydrophilic resin composition layer 20 in acid gas separation membrane 2 contained in the wound body, whereby a cause in which the separation efficiency of the acid gas is reduced by gas separation membrane element 1 may possibly be made. In order to avoid this, sealing portions 25, disposed on the end portions located at both ends of acid gas separation membrane 2 at least in a direction parallel to the axis of central tube 5, are preferably formed using sealant whose cured material has a Shore hardness of 60 or more, as described above. From this, the strength is provided to sealing portions 25 formed on the both ends of the wound body, and when the end portions of the wound body are cut with a knife, the damages of hydrophilic resin composition layer 20 can be suppressed. All of sealing portions 25, disposed on gas separation membrane element 1, may be formed from a sealant having a Shore hardness of 60 or more.

[Acid Gas Separation Membrane 2]

Acid gas separation membrane 2 has a gas selective permeability, that is an ability of selectively permeating at least an acid gas, in order to separate the acid gas from a source gas containing the same and flowing in feed-side flow channel member 3 and to permeate the acid gas. In acid gas separation membrane 2, a high selective permeability to a specific acid gas can be realized by a promoting transport mechanism in which the permeation of a specific acid gas is promoted by forming a reaction product of the acid gas with an acid gas carrier using the acid gas carrier that is reversibly reacted with the acid gas, in addition to a solution-diffusion mechanism utilizing the difference between the solubility of a gas molecule to a membrane and the diffusibility in the membrane.

The following reaction formula (1) shows a reaction of $CO_2$ and a $CO_2$ carrier in which the acid gas is $CO_2$ and cesium carbonate ($Cs_2CO_3$) is used as the acid gas carrier ($CO_2$ carrier). The symbol "⇔" in the reaction formula (1) shows that the reaction is a reversible reaction.

$$CO_2 + Cs_2CO_3 + H_2O \Leftrightarrow 2CsHCO_3 \quad (1)$$

As shown in the reaction formula (1) described above, the reversible reaction of $CO_2$ and $CO_2$ carrier requires water, and thus hydrophilic resin composition layer 20 contains a medium capable of holding the acid gas carrier and moisture, and acid gas separation membrane 2 can have first porous layer 21 supporting hydrophilic resin composition layer 20 (FIG. 3).

[Hydrophilic Resin Composition Layer 20]

Hydrophilic resin composition layer 20 has a gas selective permeability, that is an ability of selectively permeating at least an acid gas in acid gas separation membrane 2. Hydrophilic resin composition layer 20 is preferably a gelled thin film containing a hydrophilic resin composition containing acid gas carrier which can be reversibly reacted with the acid gas in the source gas, and a hydrophilic resin holding an acid gas carrier and moisture. The thickness of hydrophilic resin composition layer 20 may be appropriately selected depending on the separation performance necessary for acid gas separation membrane 2, and in usual, it is preferably within a range of 0.1 μm to 600 μm, more preferably of 0.5 μm to 400 μm, particularly preferably of 1 μm to 200 μm.

[Hydrophilic Resin Composition]

The hydrophilic resin composition, contained in hydrophilic resin composition layer 20, contains at least a hydrophilic resin and an acid gas carrier, and may contain additives other than the hydrophilic resin and the acid gas carrier, if necessary.

[Hydrophilic Resin]

The reversible reaction of the acid gas with the acid gas carrier requires water as shown, for example, in the reaction formula (1) described above. It is preferable, accordingly, that hydrophilic resin composition layer 20 contains the hydrophilic resin having a hydrophilic group such as a hydroxyl group or an ion exchange group. It is more preferable to contain a crosslinkable hydrophilic resin showing a high water-holding property due to a network structure formed by cros slinking of molecular chains of the hydrophilic resin. The pressure difference is applied to acid gas separation membrane 2 as a driving force for permeation of the acid gas through acid gas separation membrane 2, and thus it is preferable to use a hydrophilic resin containing a crosslinkable hydrophilic resin, in the terms of the pressure resistance strength required for acid gas separation membrane 2.

A polymer forming the hydrophilic resin has preferably structure units derived from, for example, alkyl acrylates, alkyl methacrylates, vinyl esters of fatty acid, or derivatives thereof. Such polymers showing the hydrophilicity may include polymers obtained by polymerization of a monomer such as acrylic acid, itaconic acid, crotonic acid, methacrylic acid, or vinyl acetate, specifically may include polyacrylic acid-based resins, polyitaconic acid-based resin, polycrotonic acid-based resins, polymethacrylic acid-based resin, and the like, as a polymer having a carboxyl group as the ion exchange group; polyvinyl alcohol-based resins, and the like, as a polymer having a hydroxyl group; acrylic acid-vinyl alcohol copolymer-based resins, acrylic acid-methacrylic acid copolymer-based resins, acrylic acid-methyl methacrylate copolymer-based resins, methacrylic acid-methyl methacrylate copolymer-based resins, and the like, as a copolymer of the polymers described above. Of these, polyacrylic acid-based resins, which are polymers of acrylic acid, polymethacrylic acid-based resins which are polymers of methacrylic acid, polyvinyl alcohol-based resins, obtained by hydrolysis of a vinyl acetate polymer, salt of acrylic acid-vinyl alcohol copolymer-based resins, obtained by saponification of a copolymer of methyl acrylate and vinyl acetate, and acrylic acid-methacrylic acid copolymer-based resins, which are copolymers of acrylic acid and methacrylic acid are more preferable, still more preferably polyacrylic acid, and salts of acrylic acid-vinyl alcohol copolymer-based resins.

The crosslinkable hydrophilic resin may be prepared by reacting a polymer showing the hydrophilicity with a crosslinking agent, or may be prepared by copolymerizing a monomer, which is a starting material of the polymer showing the hydrophilicity, with a crosslinkable monomer. The crosslinking agent or the crosslinkable monomer is not particularly limited, and conventionally known crosslinking agents and crosslinkable monomers can be used.

The crosslinking agent may include, for example, conventionally known crosslinking agents such an epoxy crosslinking agents, polyvalent glycidyl ethers, polyhydric alcohols, polyvalent isocyanates, polyvalent aziridine, haloepoxy compounds, polyvalent aldehyde, polyvalent amine, organic metal-based crosslinking agents, and metal-based crosslinking agents. The crosslinkable monomer may include, for example, conventionally known crosslinkable monomers such as divinyl benzene, N,N'-methylenebisacrylamide, trimethlolpropane trially ether, and pentaerythritol tetraallyl ether. As the crosslinking method, for example, conventionally known methods such as thermal crosslinking, crosskinking with ultraviolet ray, crosslinking with electron beam, radiation crosslinking, photocrosslinking, and methods described in Japanese Patent Laying-Open No. 2003-268009 and Japanese Patent Laying-Open No. 07-88171 may be used.

[Acid Gas Carrier]

The acid gas carrier exists in hydrophilic resin composition layer 20 containing the hydrophilic resin, and it is reversibly reacted with the acid gas dissolved in water existing in hydrophilic resin composition layer 20, whereby the acid gas is selectively permeated. Hydrophilic resin composition layer 20 contains at least one compound reversibly reactable with the acid gas as the acid gas carrier. Specific examples of the acid gas carrier may include alkali metal carbonates, alkali metal bicarbonates, alkanolamines (described in, for example, Japanese Patent No. 2086581, and the like), and alkali metal hydroxides (described in, for example, WO 2016/024523, and the like) when the acid gas is carbon dioxide; sulfur-containing compounds, alkali metal citrates, and transition metal complexes (described in, for example, Japanese Patent No. 2879057, and the like) when the acid gas is sulfur oxide; and alkali metal nitrites and transition metal complexes (described in, for example, Japanese Patent No. 2879057, and the like) when the acid gas is nitrogen oxides.

[Additive]

The hydrophilic resin composition, forming hydrophilic resin composition layer 20, may contain, for example, a hydration reaction catalyst of the acid gas or a surfactant described below as the additive, in addition to the hydrophilic resin and the acid gas carrier. The hydration reaction catalyst of the acid gas can increase the reaction speed of the acid gas and the carrier. The hydration reaction catalyst of the acid gas is preferably catalysts containing an oxo acid compound, more preferably catalysts containing an oxo acid compound including at least one element selected from the group consisting of group 14 elements, group 15 elements, and group 16 elements, still more preferably catalyst containing at least one compound selected from the group consisting of tellurous acid compounds, selenous acid compounds, arsenous acid compounds, and orthosilicic acid compounds.

[First Porous Layer 21]

Acid gas separation membrane 2 contains, as shown in FIG. 3, first porous layer 21 containing the porous membrane. First porous layer 21 has a porosity with a high gas permeability so as not to resist diffusion of the gas component permeated through hydrophilic resin composition layer 20. First porous layer 21 may be a monolayer structure or a laminate structure such as a two- or more-layer structure. First porous layer 21 has preferably a heat resistance corresponding to a process condition in a plant producing hydrogen, urea, or the like, in which the application of acid gas separation membrane 2 is assumed. In the present specification, "heat resistance" means that even if a member such as first porous layer 21 is stored for 2 hours in a temperature condition higher than a process condition, the member keeps the same shape as before the storage, and curls caused by heat shrinkage or thermofusion cannot be visually observed.

First porous layer 21 is preferably formed from a resin material. The resin material forming the porous membrane may include, for example, polyolefin-based resins such as polyethylene (PE) and polypropylene (PP); fluorine-containing resins such as polytetrafluoroethylene (PTFE), polyvinyl fluoride (PVF), and polyvinylidene fluoride (PVDF); polystyrene (PS); polyester resins such as polyethylene terephthalate (PET), and polyethylene naphthalate; polyether sulfone (PES), polyphenylene sulfide (PPS), polysulfone (PSF), polyimide (PI), polyetherimide (PEI), polyether ether ketone (PEEK), high molecular weight polyester, heat resistant polyamide, aramid, polycarbonate, and the like. Of these, at least one resin selected from the group consisting of polyethylene (PE), polypropylene (PP), fluorine-containing resins, polystyrene (PS), polyethylene terephthalate (PET), polyether sulfone (PES), polyphenylene sulfide (PPS), and polysulfone (PSF) are preferable in the terms of the water-repellency and the heat resistance, and because they satisfy the formula (I) described above, and the fluorine-containing resin and PP are more preferable.

The thickness of first porous layer 21 is not particularly limited, and in usual, it is preferably within a range of 10 µm to 3000 µm, more preferably within a range of 10 µm to 500 µm, still more preferably within a range of 15 µm to 150 µm, in the terms of the mechanical strength. The average pore size of pores in first porous layer 21 is not particularly limited, and it is preferably 10 µm or less, more preferably within a range of 0.005 µm to 1.0 µm. The porosity of first porous layer 21 is preferably within a range of 5% to 99%, more preferably within a range of 30% to 90%. First porous layer 21 having the average pore size and the porosity within the range described above satisfies the relation represented by the formula (I) above, and thus even if acid gas separation membrane 2 is used in a condition with temperature change, the reduction of the separation efficiency of the acid gas can be suppressed.

First porous layer 21 may be subjected to a hydrophilization treatment in a region in which the sealant penetrates prior to the application of the sealant, in order to improve the penetration property of the sealant forming sealing portion 25 described above. The hydrophilization treatment may be performed, for example, by applying the same surfactant as that added to a coating liquid described below.

[Method for Producing Acid Gas Separation Membrane 2]

The production of acid gas separation membrane 2 contains three steps of a first step (a coating liquid fabricating step), a second step (an applying step), and a third step (a drying step). The second step and the third step are performed preferably using a Roll-to-Roll type coating machine and drying machine by which the coating and drying are performed while the porous membrane is continuously conveyed.

In the first step (the coating liquid fabricating step), the hydrophilic resin composition containing at least the hydrophilic resin and the acid gas carrier is mixed with a medium to prepare coating liquid.

The medium may include, for example, protonic polar solvents such as water and alcohols including methanol, ethanol, 1-propanol, and 2-propanol; nonpolar solvents such as toluene, xylene, and hexane; aprotic polar solvents such as ketones including acetone, methyl ethyl ketone, and methyl isobutyl ketone, N-methylpyrrolidone, N,N-dimethylacetoamide, and N,N-dimethylformamide; and the like. The medium may be used alone or a mixture of two or more kinds within a range where the media are compatible with each other. Of these, mediums containing at least one member selected from water and alcohols such as methanol, ethanol, 1-propanol, and 2-propanol are preferable, and mediums containing water are more preferable.

The coating liquid may be added with a surfactant, if necessary. When the surfactant is added to the coating liquid, the surfactant is unevenly distributed at an interface between the hydrophilic resin composition layer 20 formed from the coating liquid and the porous membrane by applying such a coating liquid to the porous membrane, whereby the wettability with the porous membrane improved, thus resulting in the improvement of unevenness of the film thickness. The surfactant is not particularly limited, and conventionally known surfactants may be used, for example, polyoxyethylene polyoxypropylene glycols, polyoxyethylene alkylphenyl ethers, polyoxyethylene alkyl ethers, fluorine-containing surfactants, silicone-based surfactants, and the like. The surfactant may be used alone or as a mixture of two or more kinds. The coating liquid may contain the hydration reaction catalyst of the acid gas described above.

In the second step (the applying step), the coating liquid, prepared in the first step, is applied to one surface of the porous membrane to form a coating film. The temperature of the coating liquid in the second step may be appropriately decided depending on the composition or concentration. When the temperature is too high, a large amount of medium may be evaporated from the coating liquid, thus resulting in the change of the composition or concentration, or evaporation marks may possibly be generated on the coating film. The temperature is, accordingly, set preferably at a temperature range of 15° C. or higher, more preferably room temperature (20° C.) or higher and 5° C. or lower than a boiling temperature of the medium used. For example, when water is used as the medium, the temperature of the coating liquid in the second step is preferably set at a temperature range of 15° C. to 95° C.

The method for applying the coating liquid to the porous membrane is not particularly limited, and may include, for example, a spin coating method, bar coating method, a die coating method, a blade coating method, an air knife coating method, a gravure coating method, a roll coating method, a spray coating method, a dip coating method, a comma roll coating method, a kiss coating method, a screen printing, an ink jet printing, and the like. As for the application quantity of the coating liquid, the basis weight (the solid amount per unit area) is preferably within a range of 1 g/m$^2$ to 1000 g/m$^2$, more preferably 5 g/m$^2$ to 750 g/m$^2$, still more preferably 10 g/m$^2$ to 500 g/m$^2$. The basis weight can be controlled by a forming speed of the coating film (for example, a conveying speed of the porous membrane), a concentration of the coating liquid, a discharge quantity of the coating liquid, or the like. The coating liquid may be applied to the porous membrane in the state of a stripe or dot.

The porous membrane to which the coating liquid is applied may be a member corresponding to first porous layer 21 in the acid gas separation membrane 2, or a member corresponding to the second porous layer. In the production of the acid gas separation membrane 2, when the coating liquid is applied to the porous membrane corresponding to the second porous layer, a step of laminating a porous membrane corresponding to first porous layer 21 on a surface opposite to the second porous layer in hydrophilic resin composition layer 20 may be contained, and when the coating liquid is applied to a porous membrane corresponding to the first porous layer 21, a step of laminating a porous membrane corresponding to the second porous layer on a surface opposite to first porous layer 21 in hydrophilic resin composition layer 20 may be contained.

The porous membrane to which the coating liquid is applied may be a pre-coated member for forming hydrophilic resin composition layer 20. When the coating liquid is applied to the pre-coated member, after the third step (the drying step) described below, a step of releasing the formed hydrophilic resin composition layer 20 from the pre-coated member, and a step of laminating the released hydrophilic resin composition layer 20 on first porous layer 21 or the second porous layer. For that reason, the pre-coated member may be a porous material capable of releasing the hydrophilic resin composition layer 20 formed on the pre-coated member without damages. In the production of the acid gas separation membrane 2, when the released hydrophilic resin composition layer 20 is laminated on first porous layer 21, a step of laminating a porous membrane corresponding to the second porous layer on a surface opposite of first porous layer 21 of hydrophilic resin composition layer 20 may be contained, and when the released hydrophilic resin composition layer 20 is laminated on the second porous layer, a step of laminating a porous membrane corresponding to first porous layer 21 on a surface opposite to the second porous layer of hydrophilic resin composition layer 20 may be contained.

In the third step (the drying step), the medium is removed from the coating film. The method for removing the medium is not particularly limited, and it is preferable to dry the coating film by passing heated air, or the like, through the medium to evaporate and remove the medium. Specifically, for example, the medium may be evaporated and removed from the coating film by passing the applied product (first porous layer 21 on which the coating film is formed) through a circulation drier whose temperature and humidity are controlled at predetermined values. The drying temperature of the coating film may be appropriately decided depending on the medium of the coating liquid and the kind of first porous layer 21. In usual, the temperature is preferably set at a temperature higher than a coagulation temperature of the medium and lower than a melting temperature of the material forming first porous layer 21, and it is generally preferably within a range of 80° C. to 200° C.

Hydrophilic resin composition layer 20 is formed through the third step, the drying step. Hydrophilic resin composition layers 20 may be laminated in a manner in which the second step and the third step are repeatedly performed one or more times on the exposure surface (a surface opposite to a surface brought into contact with the porous membrane) in hydrophilic resin composition layer 20. By this lamination, generation of pin holes on hydrophilic resin composition layer 20, caused by unevenness of the coating film when the coating liquid is applied, can be suppressed. When the second step and the third step are repeatedly performed, the coating conditions such as a composition and an application quantity of the coating liquid and the drying conditions may be the same or different in each lamination of hydrophilic resin composition layer 20. Acid gas separation membrane 2 in gas separation membrane element 1 can be produced by performing the first step, the second step, and the third step.

[Feed-Side Flow Channel Member 3]

Feed-side flow channel member 3 forms a flow channel space to which a source gas containing the acid gas is fed, and the source gas is introduced through the flow channel space into the inside of the wound body. Feed-side flow channel member 3 preferably has a function as the flow channel material forming the flow channel space for the source gas, and a function of reducing a pressure loss of the source gas as much as possible, while promoting surface renewal of a surface on the side of feed-side flow channel member 3 of acid gas separation membrane 2 by generating turbulence in the source gas. From the viewpoint, feed-side flow channel member 3 has preferably a network shape (a net shape, a mesh shape, or the like). The flow channel of the source gas depends on the network shape, and thus a unit lattice shape of the network in feed-side flow channel member 3 may be selected according to the objective from, for example, a square, a rectangle, a rhomboid, a parallelogram, and the like. The material forming feed-side flow channel member 3 is not particularly limited, and a material having heat resistance according to the temperature condition when acid gas separation membrane 2 is used is preferable. For example, in addition to the same resin materials as the resin materials recited as the material for first porous layer 21, inorganic materials such as metals, glass, and ceramics may be preferably used. Specifically, PTFE, PP, polycyclohexanedimethylene terephthalate (PCT), PES, PSF, PEEK, PI, and metals are preferable, and PTFE, PP, PCT, PPS, PEEK, and metals are more preferable. Feed-side flow channel member 3 may be a monolayer structure or a laminate structure of two- or more-layer structure.

[Permeate-Side Flow Channel Member 4]

Permeate-side flow channel member 4 forms flow channel space through which gas permeated through acid gas separation membrane 2 flows, and the permeate gas is introduced into central tube 5 through the flow channel space. Permeate-side flow channel member 4 has preferably a function as the flow channel material forming the flow channel space for the permeate gas, and a function of promoting surface renewal of a surface on the side of permeate-side flow channel member 4 of acid gas separation membrane 2 by generating turbulence in the permeate gas. From the viewpoint, permeate-side flow channel member 4 has preferably a network shape (a net shape, a mesh shape, or the like). The flow channel of the permeate gas depends on the network shape, and thus a unit lattice shape of the network in permeate-side flow channel member 4, may be selected according to the objective from, for example, a square, a rectangle, a rhomboid, a parallelogram, and the like. The material forming permeate-side flow channel member 4 is not particularly limited, and a material having heat resistance according to the temperature condition when acid gas separation membrane 2 is used is preferable. For example, in addition to the same resin materials as the resin materials recited as the material for first porous layer 21, inorganic materials such as metals, glass, and ceramics may be preferably used. Specifically, PTFE, PP, PCT, PES, PSF, PEEK, PI, and metals are preferable, and PTFE, PP, PCT, PPS, PEEK, and metals are more preferable. Permeate-side flow channel member 4 may be a monolayer structure or a laminate structure of two- or more-layer structure.

[Central Tube 5]

Central tube 5 is a conduit pipe of collecting the gas permeated through acid gas separation membrane 2 and exhausting the permeate gas from gas separation membrane element 1. The material for central tube 5 is not particularly limited, and a material having heat resistance according to the temperature condition when acid gas separation membrane 2 is used is preferable. The wound body is formed by winding multiple members including acid gas separation membrane 2 around its periphery, and thus it is preferably a material having a mechanical strength. As the material for central tube 5, for example, PSF and stainless steel are preferably used. The diameter, length, and wall thickness of central tube 5 may be appropriately decided according to the size of gas separation membrane element 1, the number of membrane reefs 6 in laminate 7, the amount of the permeate gas, the mechanical strength required for central tube 5, and the like.

Central tube 5 is preferably a circular tube when the wound body is cylindrical, or preferably is a rectangular tube when the wound body is rectangular.

Central tube 5 has a flow channel space for the permeate gas of permeate-side flow channel member 4 and a plurality of holes 30 communicating with a hollow space inside central tube 5 on the periphery surface of central tube 5, as shown in FIG. 2. The number and the size of holes 30 provided in central tube 5 may be decided considering the amount of the permeate gas fed from permeate-side flow channel member 4 and the mechanical strength required for central tube 5. For example, when the size of holes provided in central tube 5 cannot be increased, the number of holes provided in central tube 5 may be increased to secure the flow channel for the permeate gas. Holes 30, provided in central tube 5, may be formed at a uniform interval along a direction parallel to an axis of central tube 5, or may be unevenly distributed at an either end portion side of central tube 5.

[Second Porous Layer]

The second porous layer (the protective layer) is a layer containing porous membrane that may be provided on acid gas separation membrane 2. The second porous layer may be provided on a surface opposite to a surface on which first porous layer 21 on hydrophilic resin composition layer 20 in acid gas separation membrane 2 is provided. In gas separation membrane element 1, the second porous layer may be provided between hydrophilic resin composition layer 20 and feed-side flow channel member 3. When the wound body is compressed upon the manufacturing of gas separation membrane element 1, the hydrophilic resin composition layer 20 and feed-side flow channel member 3 are rubbed against each other. When the second porous layer is provided, however, hydrophilic resin composition layer 20 is protected, and damages, caused by the rubbing described above can be suppressed.

The material for the second porous layer is not particularly limited so long as it is a material having low friction with feed-side flow channel member 3 and a high gas permeability, and materials having heat resistance according to the temperature condition when acid gas separation membrane 2 is used are preferable. For example, in addition to the same resin materials as the resin materials recited as the material for first porous layer 21, inorganic materials such as metals, glass, and ceramics may be preferably used. As the porous membrane forming the second porous layer, for example, porous membrane having an average pore size of 0.001 μm or more and 10 μm or less can be used, and for example non-woven fabrics, woven fabrics, and nets may also be used. The second porous layer may be a monolayer structure or a laminate structure such as a two- or more-layer structure. The thickness, average pore size, and porosity of the second porous layer may be the same as or different from those of first porous layer 21.

[Third Porous Layer]

The third porous layer (the supporting layer for reinforcement) is a layer containing a porous membrane that may be provided on acid gas separation membrane 2, and may be provided on a surface opposite to a surface on which hydrophilic resin composition layer 20 on first porous layer 21 in acid gas separation membrane 2 is provided. In gas separation membrane element 1, the third porous layer may be provided between first porous layer 21 and permeate-side flow channel member 4. When the third porous layer is provided, in a step in which hydrophilic resin composition layer 20 is formed on first porous layer 21, a strength capable of withstanding a tensile load applied to first porous layer 21 can be additionally provided upon the production of acid gas separation membrane 2 described above, and a strength capable of withstanding a pressure load applied to acid gas separation membrane 2 can be additionally provided upon the separation of the permeate gas from the source gas. The structure and the material of the third porous layer are not particularly limited so long as they have a pressure resistance strength and an elongation resistance, and has a gas permeability, and materials having the heat resistance according to the temperature condition when acid gas separation membrane 2 is used are preferable. For example, in addition to the same resin materials as the resin materials recited as the material for first porous layer 21, inorganic materials such as metals, glass, and ceramics may be preferably used. As the porous membrane forming the third porous layer, for example, porous membrane having an average pore size of 0.001 μm or more and 10 μm or less can be used, and for example non-woven fabrics, woven fabrics, and nets may also be used. The third porous layer may be a monolayer structure or a laminate structure such as a two- or more-layer structure.

The third porous layer may be subjected to a hydrophilization treatment in a region in which the sealant penetrate prior to the application of the sealant, in order to improve the penetration property of the sealant. The hydrophilization treatment may be performed, for example, by applying the same surfactant as that added to a coating liquid described above.

[Method for Manufacturing Gas Separation Membrane Element 1]

Figure 4A:
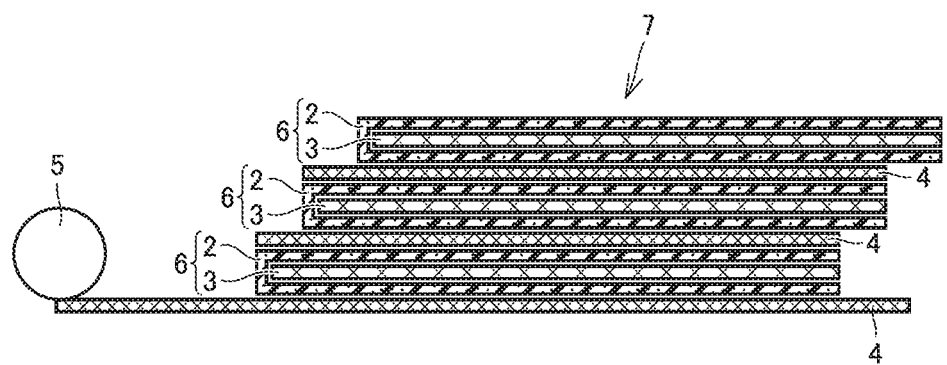
FIG. 4A is a development outline cross-sectional view showing one example of a gas separation membrane element of the present invention.
Figure 4B:
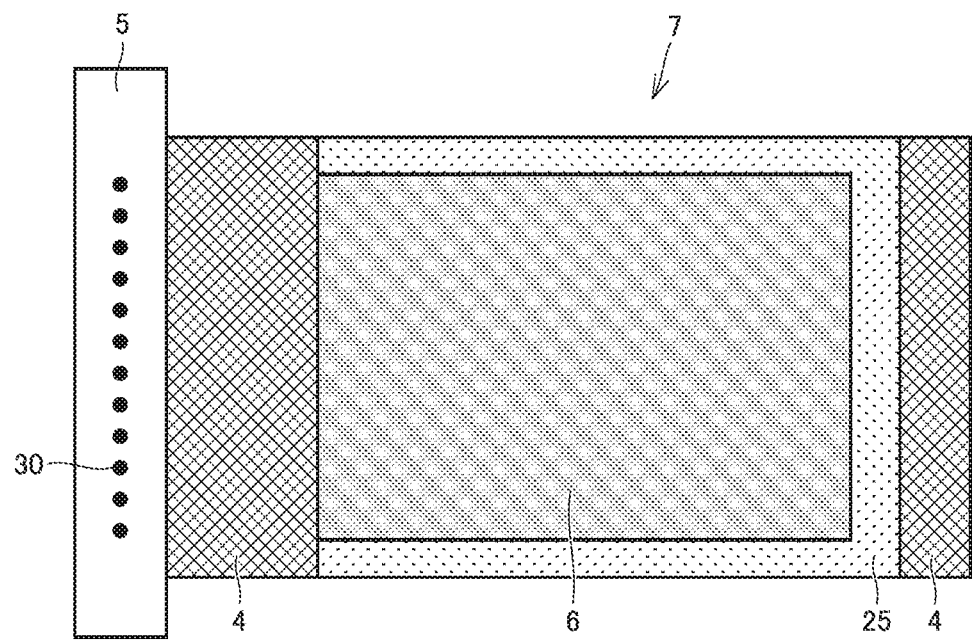
FIG. 4B is a development outline plan view showing one example of a gas separation membrane element of the present invention.

Gas separation membrane element 1 may be manufactured by the following steps. As shown in FIGS. 4A and 4B, an end portion (an end portion located at an internal circumference side in the wound body) close to central tube 5, among end portions of permeate-side flow channel member 4 located in a direction parallel to an axis of central tube 5 when the wound body is formed, is fixed to a periphery surface of central tube 5 using a pressure sensitive adhesive tape or adhesive. A plurality of membrane reefs 6 in which feed-side flow channel member 3 is inserted into two-fold acid gas separation membrane 2 so that the first porous layer side of acid gas separation membrane 2 faces the outside are fabricated.

Next, one membrane reef 6 is laminated on permeate-side flow channel member 4 fixed to central tube 5. The sealant is applied to one surface of membrane reef 6, and membrane reef 6 is laminated on permeate-side flow channel member 4 so that the applied surface faces permeate-side flow channel member 4. When the sealant, applied to membrane reef 6, sticks first porous layer 21 of membrane reef 6 to permeate-side flow channel member 4, and forms sealing portion 25, it is preferable to apply the sealant to membrane reef 6 so that sealing portion 25 is formed. Specifically, when sealing portion 25 is formed in an envelope shape, the sealant may be applied linearly along both end portions of membrane reef 6 in a direction parallel to an axis of central tube 5 and an end portion far from central tube 5 (the end portion located on the periphery side in the wound body) among both end portions in a direction vertical to the axis of central tube 5.

The sealant may be applied to membrane reef 6 to cause the penetration of the sealant into first porous layer 21 and permeate-side flow channel member 4, as described above, and also it is possible that second sealing portion 25*b* is formed from the sealant applied to membrane reef 6 on first porous layer 21, and first sealing portion 25*a* is formed from the sealant applied to permeate-side flow channel member 4, and then membrane reef 6 and permeate-side flow channel member 4 may be laminated. Alternatively, membrane reef 6 having first porous layer 21 on which second sealing portion 25*b* has been previously formed, and permeate-side flow channel member 4 on which first sealing portion 25*a* has been previously formed are pasted together with an adhesive to stick them.

When membrane reef 6 is laminated on permeate-side flow channel member 4, a folded part in two-fold membrane reef 6 is directed to the central tube 5 side and membrane reef 6 is laminated so that the folded part is disposed at a position separated from a periphery surface of central tube 5.

Subsequently, the sealant is applied to an exposed surface of membrane reef 6 laminated on permeate-side flow channel member 4 (a surface of membrane reef 6 opposite to a side facing permeate-side flow channel member 4). The sealant, as described above, may be applied so that sealing portion 25 is formed in the wound body. On the exposed surface of membrane reef 6 to which the sealant is applied, a permeate-side flow channel member 4 and a membrane reef 6 (hereinafter which may be sometimes referred to as "next permeate-side flow channel member 4" and "next membrane reef 6") are pasted and laminated in this order. At that time, it is preferable that areas of next permeate-side flow channel member 4 and next membrane reef 6 are the same as or smaller than those of permeate-side flow channel member 4 and membrane reef 6 which has previously laminated. In next permeate-side flow channel member 4, an end portion closer to central tube 5 among both end portions in a vertical to the axis of central tube 5 is laminated so that it coincides with an end portion closer to central tube 5 among end portions in a lengthwise direction of membrane reef 6 which has been previously laminated. Alternatively, in next permeate-side flow channel member 4, an end portion closer to central tube 5, among end portions in a direction vertical to the axis of central tube 5, may be laminated on an exposed surface of permeate-side flow channel member 4 which has been previously laminated, and the other end portion may be laminated on membrane reef 6 which has been previously laminated. Next membrane reef 6 is laminated so that it is disposed at a position further separated from the periphery surface of central tube 5 than next permeate-side flow channel member 4. By the method described above, sealing portion 25 containing second sealing portion 25*b*, first sealing portion 25*a*, and second sealing portion 25*b* is formed.

Permeate-side flow channel members 4 and membrane reefs 6 are laminated by repeating the procedure described above so that end portions closer to central tube 5, among end portions of permeate-side flow channel member 4 and membrane reef 6 in a vertical to the axis of central tube 5, are separated in order from central tube 5, whereby laminate 7 in which permeate-side flow channel members 4 and membrane reefs 6 are laminated is formed. After that, the sealant is applied to an exposed surface of membrane reef 6 finally laminated in the same manner as above, and laminate 7 is rolled around the periphery of central tube 5 so that holes 30 in central tube 5 are covered with permeate-side flow channel member 4 to form a wound body. As described above, permeate-side flow channel members 4 and membrane reefs 6 are laminated so that they are gradually separated from central tube 5 at predetermined intervals, and thus a wound body can be formed in a state in which the end portions of permeate-side flow channel member 4 and membrane reef 6 on the central tube 5 side stand in a line at pre-determined intervals in a circumferential direction when laminate 7 is rolled around central tube 5; as a result, the permeate gas, flowing through permeate-side flow channel member 4, can be efficiently collected in central tube 5.

It is preferable that laminate 7 is rolled around central tube 5 while a tension is applied thereto. When laminate 7 is started to be rolled around central tube 5, it is preferable that an adhesive is previously applied to both end portions of permeate-side flow channel member 4 on which membrane reef 6 is not laminated in a direction parallel to the axis of central tube 5.

After laminate 7 is rolled around central tube 5 to obtain the wound body, a peripheral tape is rolled around a periphery surface of the wound body to fix it, whereby unwinding of the wound body can be suppressed. In order to suppress occurrence of rolling collapse (telescope) phenomenon of the wound body while gas separation membrane element 1 is used, anti-telescope devices can be attached to both end portion of the wound body. A reinforcing material may be further rolled around the periphery of the wound body in which the peripheral tape has been rolled and the anti-telescope device has been attached as an outer wrap (a reinforcement layer). By the method described above, spiral-wound gas separation membrane element 1 can be manufactured.

When gas separation membrane element 1 has a second porous layer, a second porous layer may be laminated on a surface opposite to a surface on which first porous layer 21 on hydrophilic resin composition layer 20 in acid gas separation membrane 2 is disposed, and the resulting product may be folded in two so that the second porous layer side of the acid gas separation membrane having the second porous layer faces the inside, whereby a membrane reef 6 into which feed-side flow channel member 3 is inserted, as described above, may be formed.

The above explanation was made using an example in which the second porous layer is laminated on hydrophilic resin composition layer 20 in acid gas separation membrane 2, and it is folded in two so that the second porous layer side faces the inside, but the present invention is not limited thereto. As described above, when the porous membrane used in the formation of hydrophilic resin composition layer 20 is used as the second porous layer, first porous layer 21 may be laminated on a surface on which hydrophilic resin composition layer 20 that is formed on one surface of the porous membrane is exposed, and the resulting product may be folded in two so that the second porous layer side of the acid gas separation membrane having the second porous layer faces the inside, whereby membrane reef 6 may be formed.

When gas separation membrane element 1 has the third porous layer, the third porous layer may be laminated on a surface opposite to a surface to which hydrophilic resin composition layer 20 on first porous layer 21 is formed when acid gas separation membrane 2 is produced. When acid gas separation membrane 2 provided with the third porous layer is used, sealing portions 25 are formed on permeate-side flow channel member 4, the third porous layer, and first porous layer 21. In the sealing portion formed on the reinforcement layer, the sealant may be applied to membrane reef 6 to form it, as described above, or it may be previously formed on the third porous layer.

[Acid Gas Separation Membrane Module]

An acid gas separation membrane module is obtained by providing at least one gas separation membrane element 1 in, for example, stainless steel housing (container). The acid gas separation membrane module can be produced by housing at least one gas separation membrane element 1 in the housing, and attaching an inlet for source gas, an outlet for permeate gas, and an outlet for source gas that is not permeated through acid gas separation membrane 2 (retentate gas), to the housing.

The arrangement and the number of gas separation membrane elements 1 may be selected depending on a recovery rate of acid gas required. Here, the recovery rate of acid gas is a value calculated by the following formula:

Recovery rate of acid gas=(flow rate of acid gas in permeate gas/flow rate of acid gas in source gas)×100

When two or more gas separation membrane elements 1 are disposed in the housing, the two or more gas separation membrane elements 1 may be arranged in parallel or in series in the housing. Here, the phrase "be arranged in parallel" refers to a state in which at least source gas is distributed and introduced into a feed-side end portions 31 of multiple gas separation membrane elements 1 (FIG. 2), and the phrase "be arranged in series" refers to a state in which, the source gas (retentate gas) that is exhausted from an exhaust port 32 or an end portion 33 on exhaust side (FIG. 2) and has not been permeated through acid gas separation membrane 2 in at least gas separation membrane element 1 in a former stage, is introduced into feed-side end portion 31 of gas separation membrane element 1 in a latter stage.

For example, when two gas separation membrane elements 1 are arranged in parallel in the housing, gas separation membrane elements 1 are arranged in series seemingly in the housing, the source gas is fed into two gas separation membrane elements 1 in parallel from an inlet provided on the housing, the retentate gas that is not permeated through acid gas separation membrane 2 in each gas separation membrane element 1, is exhausted from two outlets provided on the housing. In such a case, the inlet for source gas and the outlet for retentate gas, provided on the housing, may be provided on each gas separation membrane element 1, or the two gas separation membrane elements 1 may be share the inlet and the outlet. Alternatively, one inlet for feeding the source gas may be provided, and an outlet for the retentate gas may be provided at each gas separation membrane element 1, two outlets being provided, or, on the contrary, an inlet for feeding the source gas may be provided at each gas separation membrane element 1, two inlets being provided, and one outlet for the retentate gas may be provided.

[Acid Gas Separation Apparatus]

An acid gas separation apparatus contains at least one acid gas separation membrane module. The arrangement and the number of the acid gas separation membrane module provided in the acid gas separation device may be selected depending on the throughput required, the recovery rate of the acid gas, the size of a place where the acid gas separation apparatus is set, and the like.

[Method for Separating Acid Gas]

The source gas containing at least the acid gas is introduced into the housing through the feed port of the acid gas separation membrane module, the source gas is continuously fed into feed-side flow channel member 3 through the feed-side end portion 31 of gas separation membrane element 1 in the housing (allow a in FIG. 2), and the acid gas, contained in the source gas flowing through feed-side flow channel member 3, is permeated through acid gas separation membrane 2. The permeate gas, which has been permeated through acid gas separation membrane 2, flows in permeate-side flow channel member 4 and is fed into central tube 5 through holes 30, and continuously collected from exhaust port 32 of central tube 5 (allow b in FIG. 2). After that, the permeate gas is exhausted from the permeate gas exhaust port of the acid gas separation membrane module communicated with the inside of central tube 5. On the other hand, the retentate gas, which has not been permeated through acid gas separation membrane 2, is continuously exhausted from exhaust-side end portion 33 of gas separation membrane element 1 (allow c in FIG. 2), and then is exhausted from a retentate gas exhaust port of acid gas separation membrane module communicated with exhaust-side end portion 33. As described above, the acid gas can be separated from the source gas containing at least the acid gas.

The explanation described above is made using a case in which the spiral-wound gas separation membrane element is used as the gas separation membrane element and the specific gas permeated through the gas separation membrane is the acid gas, but the explanation above can be applied to a hollow-fiber type, a tubular type or a plate-and-frame type element, in addition to the spiral-wound element. For example, the explanation about the gas separation membrane (the first porous layer and the hydrophilic resin composition layer), the hydrophilic resin composition (the hydrophilic resin and the carrier), the second porous layer, the third porous layer, the sealing portion, the sealant, and the thermal expansion coefficients A and B can be applied to not only the spiral-wound gas separation membrane element but also the other type of gas separation membrane elements described above. In the membrane reef in the spiral-wound gas separation membrane element, the feed-side flow channel member is inserted into the two-fold gas separation membrane, but, for example, in the membrane reef used in the plate-and-frame type gas separation membrane element, the permeate-side flow channel member may be inserted into the two-fold gas separation membrane.

EXAMPLES

The present invention is more specifically explained by showing examples and comparative examples, but the present invention is not limited thereto.

[Measurement of Thermal Expansion Coefficient A of Sealing Portion]

A gas separation membrane element, manufactured in each example or each comparative example was disassembled, and a sample for measurement having a size of 10 mm×5 mm was obtained by cutting the disassembled gas separation membrane element so that second sealing portion 25b/first sealing portion 25a/second sealing portion 25b and hydrophilic resin composition layers on two second sealing portions 25b were contained. An average coefficient of linear expansion, obtained by measuring the sample for measurement in the following measurement conditions using the following measuring apparatus, was defined as thermal expansion coefficient A of a sealing portion.

[Measuring Apparatus and Measurement Conditions of Thermal Expansion Coefficient A of Sealing Portion]

| Measuring Apparatus | TMA 402 F1 Hyperion (manufactured by NETZSCH Inc.) |
|---|---|
| Measurement Conditions | |
| Measurement Mode | Pulling |
| Measurement Temperature Range | 25° C. to 35° C. |
| Size of Measurement Sample | 10 mm × 5 mm |
| Temperature Rising Rate | 10° C./minute |
| Measurement load | 0.05 N (a load giving no deflection or deformation to a sample at room temperature) |
| Measurement Atmosphere | Helium (a flow rate of 50 mL/minute) |

[Measurement of Thermal Expansion Coefficient B of Material Forming First Porous Layer]

Using a porous membrane used for forming a first porous layer used in each example or each comparative example, thermal expansion coefficient B of a material forming the first porous layer was measured by the following steps. After the porous membrane was heated to a temperature equal to or higher than a glass transition temperature (Tg) to sufficiently shrink it, a sheet sample having a size of 10 mm×5 mm was prepared. An average coefficient of linear expansion of the sheet sample, obtained by using the following measuring apparatus in measurement condition, was defined as thermal expansion coefficient B of the material forming the first porous layer.

[Measuring Apparatus and Measurement Conditions of Thermal Expansion Coefficient B of Material Forming First Porous Layer]

| Measuring Apparatus | TMA 4030SE (manufactured by NETZSCH Inc.) |
|---|---|
| Measurement Conditions | |
| Measurement Mode | Pulling |
| Measurement Temperature Range | 25° C. to 35° C. |
| Size of Measurement Sample | 10 mm × 5 mm |
| Temperature Rising Rate | 10° C./minute |
| Measurement load | 0.02 N (a load giving no deflection or deformation to a sample at room temperature) |
| Measurement Atmosphere | Helium (a flow rate of 50 mL/minute) |

[Airtight Test]

A sample for airtight test was fabricated using a porous membrane used for forming a first porous layer used in each example or each comparative example, a coating liquid I, a surfactant and a sealant, and an airtight test was performed by the following steps. Coating liquid of a hydrophilic resin composition was applied to one surface of the porous membrane in a dry thickness of 50 μm, and it was dried at a temperature of 120° C. for 5 minutes to obtain a porous membrane having a coating film. The obtained porous membrane having the coating film was cut into a circle having a diameter of 50 mm, and the surfactant was applied to the center of a surface on which the coating film was not formed so that the surfactant formed a circle having a diameter of 13 mm. After that, the sealant was applied thereto so that the sealant penetrated in a thickness direction in a circle range of a diameter of 20 mm and was cured to obtain a sample for airtight test.

The obtained sample for airtight test was put in a sealed container and retained at 20° C. (room temperature) for 60 minutes, and then a cycle in which the sample was retained at an assumed temperature of gas membrane separation process shown in Table 1 (Column "assumed temperature" in Table 1) for 60 minutes was repeated 4 times. After that, the sample for airtight test was set in a cell for airtight test, a permeance of nitrogen gas was measured at a temperature of 20° C. at a feed-side pressure of 1.5 MPa at a permeate-side pressure of atmospheric pressure. As for the measurement results, it was evaluated that a permeance of nitrogen gas (permeance) of less than $1\times10^{-9}$ mol/(m$^2$·s·kPa) was best; a permeance of nitrogen gas (permeance) of $1\times10^{-9}$ mol/(m$^2$·s·kPa) or more and less than $5\times10^{-9}$ mol/(m$^2$·s·kPa) was good, and a permeance of nitrogen gas (permeance) of $5\times10^{-9}$ mol/(m$^2$·s·kPa) or more was poor.

[Tension Test]

A sample for tension test was fabricated using a porous membrane used for forming a first porous layer used in example, a coating liquid I, a surfactant and a sealant, and a tension test was performed by the following steps. Coating liquid of a hydrophilic resin composition was applied to one surface of the porous membrane, and it was dried at a temperature of 120° C. for 5 minutes to obtain a porous membrane having a coating film having a thickness of 50 μm. The obtained porous membrane having the coating film was cut into a sample member having a length of 50 mm×a width of 25 mm, two samples being prepared. In each sample member, a region up to 10 mm length from the end portion in a lengthwise direction was defined as a sealant application region. After the surfactant was applied to an adhesion region of each sample, the sealant was applied so that it penetrated in a thickness direction of the sample member. The application regions of the two sample members, to which the sealant was applied, were overlapped with each other so that the surfaces, on which the coating film was not formed, faced each other, and then, the sealant was cured to form the adhesion region to obtain a sample for tension test having a length of 90 mm×a width of 25 mm.

The obtained sample for tension test was allowed to stand in a thermostatic and humidifying chamber having a temperature of 150° C. and a relative humidity of 90% RH for 80 hours, and then both ends in the lengthwise direction of the sample for tension test were fastened with clips. A tension was applied to the sample so that the both ends fastened with the clip were pulled in opposite directions, the tension force was gradually increased until the sample for tension test was broken, and a part at break was confirmed. It was evaluated that when the part at break of the sample for tension test was within the adhesion region, the strength of the sealing portion in the gas separation membrane element was low in high temperature and high humidity conditions, and when the part at break of the sample for tension test was not within the adhesion region, the strength of sealing portion of the gas separation membrane element was high in high temperature and high humidity conditions, and it was preferable for use in high temperature and high humidity conditions.

[Material Used for Fabricating Gas Separation Membrane Element]

Materials used for fabricating the gas separation membrane element in Examples 1 to 5 and Comparative Examples 1 and 2 are shown in detailed as follows:

Feed-Side Flow Channel Member:
PPS Net (50×50 meshes) (a trademark 50-150PPS, manufactured by Dio Chemicals, Ltd.)

Permeate-Side Flow Channel Member:
Three layers of PPS Net (50×50 meshes/60×40 meshes/50×50 meshes) (trademarks 50-150PPS and 60(40)-150PPS, manufactured by Dio Chemicals, Ltd.)

Central Tube:
A stainless steel tube having an outer diameter of one inch in which 20 holes having a diameter of 3 mm were formed in an outer wall of thereof. The holes were formed in two rows in a direction parallel to an axis of the central tube, and 10 holes were formed per row in a pitch of 25.4 mm so that the holes were uniformly arranged within a range in a direction parallel to an axis of the central tube around which the laminated was rolled. The two rows were disposed at a position opposite to each other interposing the axis of the central tube.

Sealant (1):
A two-pack mixing type epoxy-based adhesive ("2310" manufactured by Aremco Products Inc.)

Sealant (2):
A two-pack mixing type epoxy-based adhesive ("E-60HP" manufactured by Henkell & Co.)

Sealant (3):
A one-pack type epoxy-based adhesive ("EW2045" manufactured by 3M Company)

Sealant (4):
A two-pack mixing type epoxy-based adhesive ("TB-2151" manufactured by Henkell & Co.)

Sealant (5):

A one-pack silicone-based adhesive ("KE-1850" manufactured by Shin-Etsu Chemical Co., Ltd.)

Example 1

(Fabrication of Acid Gas Separation Membrane)

A container was charged with 161.38 g of water as a medium, 4 g of a crosslinked polyacrylic acid ("Aqupec HV-501" manufactured by Sumitomo Seika Chemicals Co., Ltd.) and 0.8 g of a non-crosslinked polyacrylic acid (Aqupana AP-40F" manufactured by Sumitomo Seika Chemicals Co., Ltd., 40% Na-saponified) as the hydrophilic resins, and the hydrophilic resins were dispersed in water to obtain a dispersion. After 38.09 g of a 50% aqueous cesium hydroxide solution was added to the dispersion, 12.71 g of a 10% aqueous sodium telluride solution was added thereto as an additive and was mixed, to which 1.2 g of a 10% aqueous surfactant solution ("Surflon S-242" manufactured by AGC Seimi Chemical Co., Ltd) was added and mixed to obtain coating liquid I. The obtained coating liquid I was applied to one surface of a PTFE porous membrane ("Poreflon HP-010-50" manufactured by Sumitomo Electric Fine Polymer, Inc., having a membrane thickness of 50 μm and a pore size of 0.1 μm), which was a first porous layer, and then the same PTFE porous membrane as used in the first porous layer was put thereon as a second porous layer, which was dried at a temperature of about 120° C. for about 15 minutes, whereby an acid gas separation membrane having second porous layer was fabricated which had first porous layer 21 on which hydrophilic resin composition layer 20 and the second porous layer were provided in this order.

(Manufacture of Gas Separation Membrane Element)

A gas separation membrane element was manufactured as described below. A feed-side flow channel member 3 was inserted into the acid gas separation membrane having the second porous layer, obtained in the fabrication of the acid gas separation membrane, in a two-fold state so that the second porous layer side faced the inside, and hydrophilic resin composition layer 20 was bonded to feed-side flow channel member 3 using a two-pack mixing type epoxy-based adhesive ("2310" manufactured by Aremco Products Inc.) to obtain a membrane reef 6.

One end of the first layer of permeate-side flow channel member 4 was fixed to central tube 5 using the two-pack mixing type epoxy-based adhesive ("2310" manufactured by Aremco Products Inc.), as shown in FIGS. 4A and 4B. Using the membrane reef 6 obtained above as the first layer of the membrane reef 6, sealant (1) was applied linearly along both end portions in a direction parallel to an axis of central tube 5 and an end portion far from central tube 5 among both end portions in a direction vertical to the axis of central tube 5 on one surface of the membrane reef 6, and the first layer of membrane reef 6 was laminated on the first layer of permeate-side flow channel member 4 so that the application surface faced the permeate-side flow channel member 4. Membrane reef 6 was laminated so that it was separated from central tube 5, as shown in FIG. 4A. Sealant (1), applied to membrane reef 6, was penetrated into first porous layer 21 and permeate-side flow channel member 4 in membrane reef 6 to form a sealing portion 25. Subsequently, after sealant (1) was linearly applied to the exposed surface of the first layer of membrane reef 6 in the same manner as above, a second layer of permeate-side flow channel member 4 was laminated thereon to form a sealing portion 25.

With respect to a second layer of membrane reef 6, lamination was performed on the second layer of permeate-side flow channel member 4 in the same manner as in the fabrication of the first layer of membrane reef 6, and a third layer of permeate-side flow channel member was laminated. At that time, as shown in FIG. 4A, the lamination position of the second layer of membrane reef 6 was set at a position further far from central tube than the second layer of permeate-side flow channel member 4.

After that, a two-pack mixing type epoxy-based adhesive ("2310" manufactured by Aremco Products Inc.) was applied to both end portions in a direction parallel to the axis of central tube 5 of permeate-side flow channel member 4 on which membrane reef 6 was not laminated and the uppermost surface of membrane reef 6, and laminate 7 was rolled around central tube 5 to form a wound body. A heat-resistant tape was rolled around the periphery of the wound body as a peripheral tape, and then both end portions of the wound body in a direction parallel to the axis of the wound body were cut. An anti-telescope device was attached thereto so that cut surfaces of the both end portions were brought into contact with each other, and outer wrap (a reinforcement layer) was formed on the outermost periphery of the wound body from a fiber-reinforced resin in which a glass fiber was impregnated with an epoxy resin to obtain a gas separation membrane element 1.

Measurements of thermal expansion coefficient A of the sealing portion in the gas separation membrane element manufactured in Example 1 and thermal expansion coefficient B of the material forming the first porous layer used in Example 1, and the airtight test of the sample for airtight test, fabricated using the materials used in Example 1, were performed. The results are shown in Table 1.

Example 2

A gas separation membrane element was obtained in the same manner as in Example 1 except that sealant (2) was used as the sealant. Measurements of thermal expansion coefficient A of the sealing portion in the gas separation membrane element manufactured in Example 2 and thermal expansion coefficient B of the material forming the first porous layer used in Example 2, and the airtight test of the sample for airtight test, fabricated using the materials used in Example 2, were performed. The results are shown in Table 1.

Comparative Example 1

A gas separation membrane element was obtained in the same manner as in Example 1 except that sealant (3) was used as the sealant. Measurements of thermal expansion coefficient A of the sealing portion in the gas separation membrane element manufactured in Comparative Example 1 and thermal expansion coefficient B of the material forming the first porous layer used in Comparative Example 1, and the airtight test of the sample for airtight test, fabricated using the materials used in Comparative Example 1, were performed. The results are shown in Table 1.

Comparative Example 2

A gas separation membrane element was obtained in the same manner as in Example 1 except that sealant (4) was used as the sealant. Measurements of thermal expansion coefficient A of the sealing portion in the gas separation membrane element manufactured in Comparative Example 2 and thermal expansion coefficient B of the material forming the first porous layer used in Comparative Example 2, and the airtight test of the sample for airtight test, fabricated using the materials used in Comparative Example 2, were performed. The results are shown in Table 1.

Example 3

A gas separation membrane element was obtained in the same manner as in Example 1 except that a PP porous membrane ("3M Microporous Film" manufactured by 3M Company, having a membrane thickness of 38 μm and a pore size of 0.3 μm or less) was used as the first porous layer, and the drying conditions were set at a temperature of about 100° C. and a drying time of about 15 minutes in the fabrication of the acid gas separation membrane. Measurements of thermal expansion coefficient A of the sealing portion in the gas separation membrane element manufactured in Example 3 and thermal expansion coefficient B of the material forming the first porous layer used in Example 3, the airtight test of the sample for airtight test, fabricated using the materials used in Example 3, and the tension test of the sample for tension test, fabricated using the materials used in Example 3, were performed. The results are shown in Table 1 and Table 2.

Example 4

A gas separation membrane element was obtained in the same manner as in Example 3 except that sealant (2) was used as the sealant. Measurements of thermal expansion coefficient A of the sealing portion in the gas separation membrane element manufactured in Example 4 and thermal expansion coefficient B of the material forming the first porous layer used in Example 4, and the airtight test of the sample for airtight test, fabricated using the materials used in Example 4, were performed. The results are shown in Table 1.

Example 5

A gas separation membrane element was obtained in the same manner as in Example 3 except that sealant (4) was used as the sealant. Measurements of thermal expansion coefficient A of the sealing portion in the gas separation membrane element manufactured in Example 5 and thermal expansion coefficient B of the material forming the first porous layer used in Example 5, and the airtight test of the sample for airtight test, fabricated using the materials used in Example 5, were performed. The results are shown in Table 1.

TABLE 1

| | assumed temperature [° C.] | sealant | thermal expansion coefficient A [$10^{-6°}$ C.$^{-1}$] | supporting layer | thermal expansion coefficient B [$10^{-6°}$ C.$^{-1}$] | A/B | airtight test |
|---|---|---|---|---|---|---|---|
| Example 1 | 130 | (1) | 81 | PTFE porous membrane | 150 | 0.54 | best |
| Example 2 | 130 | (2) | 66 | PTFE porous membrane | 150 | 0.44 | best |
| Comparative Example 1 | 130 | (3) | 48 | PTFE porous membrane | 150 | 0.32 | poor |
| Comparative Example 2 | 130 | (4) | 38 | PTFE porous membrane | 150 | 0.25 | poor |
| Example 3 | 100 | (1) | 81 | PP porous membrane | 90 | 0.90 | best |
| Example 4 | 100 | (2) | 66 | PP porous membrane | 90 | 0.73 | best |
| Example 5 | 100 | (4) | 38 | PP porous membrane | 90 | 0.42 | best |

From Table 1, it is understood that the elements in Examples 1 to 5, in which the ratio A/B was within a range of 0.35 or more and 1.0 or less, have the good results in the airtight test. On the other hand, it is understood that the elements in Comparative Examples 1 and 2, in which the ratio A/B was not within a range of 0.35 or more and 1.0 or less, cannot have the good results.

Example 6

A gas separation membrane element was obtained in the same manner as in Example 3 except that sealant (5) was used as the sealant. Measurements of thermal expansion coefficient A of the sealing portion in the gas separation membrane element manufactured in Example 6 and thermal expansion coefficient B of the material forming the first porous layer used in Example 6, the airtight test of the sample for airtight test, fabricated using the materials used in Example 6, and the tension test of the sample for tension test, fabricated using the materials used in Example 6, were performed. The results are shown in Table 2.

TABLE 2

| | assumed temperature [° C.] | sealant | thermal expansion coefficient A [$10^{-6}$ °C.$^{-1}$] | supporting layer | thermal expansion coefficient B [$10^{-6}$ °C.$^{-1}$] | A/B | airtight test | tension test |
|---|---|---|---|---|---|---|---|---|
| Example 3 | 100 | (1) | 81 | PP porous membrane | 90 | 0.90 | best | out of adhesion region |
| Example 6 | 100 | (5) | 91 | PP porous membrane | 90 | 1.0 | best | within adhesion region |

From Table 1 and Table 2, it is understood that when the ratio A/B is a range of 0.35 or more and less than 1.0, the good results can be obtained in the airtight test, and also in the tension test.

INDUSTRIAL APPLICABILITY

The present invention can be utilized in a process for separating an acid gas such as carbon dioxide from synthetic gas, generated in a plant for producing hydrogen or urea, natural gas, or exhaust gas.

REFERENCE SIGNS LIST

1: spiral-wound gas separation membrane element (gas separation membrane element)
2: acid gas separation membrane (gas separation membrane), 3: feed-side flow channel member, 4: permeate-side flow channel member, 5: central tube, 6: membrane reef, 7: laminate, 20: hydrophilic resin composition layer, 21: first porous layer, 25: sealing portion, 25a: first sealing portion, 25b: second sealing portion, 30: hole, 31: feed-side end portion, 32: exhaust port, 33: exhaust-side end portion

The invention claimed is:

1. A gas separation membrane element which separates a specific gas from a source gas containing the specific gas, the gas separation membrane element comprising:
    a feed-side flow channel member to which the source gas is fed;
    a gas separation membrane;
    a permeate-side flow channel member in which the specific gas permeated through the gas separation membrane flows; and
    a sealing portion for preventing mixture of the source gas and the specific gas permeated through the gas separation membrane,
    the gas separation membrane including
        a first porous layer including a porous membrane,
        a hydrophilic resin composition layer selectively permeating the specific gas contained in the source gas, and
        a second porous layer including a porous membrane,
    the hydrophilic resin composition layer being disposed directly on the first porous layer,
    the second porous layer being disposed directly on a surface of the hydrophilic resin composition layer opposite to the surface of the hydrophilic resin composition layer on which the first porous layer is provided,
    the material forming the permeate-side flow channel member including at least one kind of material selected from the group consisting of polyethersulfone (PES), polysulfone (PSF), polyetheretherketone (PEEK), polyimide (PI), polyphenylene sulfide (PPS), and metals,
    the sealing portion being a region in which a cured material of a sealant penetrates in at least the first porous layer and the permeate-side flow channel member,
    a thermal expansion coefficient A of the sealing portion and a thermal expansion coefficient B of a material forming the first porous layer satisfying a relation (I):

$$0.35 \leq A/B \leq 1.0 \quad \text{(I); and}$$

whereby:
    (a) the gas separation membrane includes a third porous layer including a porous membrane,
    (b) the third porous layer is disposed on a surface opposite to a surface of the first porous layer on which the hydrophilic resin composition layer is disposed, and between the first porous layer and the permeate-side flow channel member,
    (c) the material forming the third porous layer includes at least one kind of material selected from the group consisting of fluorine-containing resins, polystyrene (PS), polyester resins, polyether sulfone (PES), polyphenylene sulfide (PPS), polysulfone (PSF), polyimide (PI), polyetherimide (PEI), polyether ether ketone (PEEK), high molecular weight polyester, heat resistant polyamide, aramid, polycarbonate, metals, glass, and ceramics, and
    (d) the sealing portion is a region in which a cured material of a sealant penetrates in at least the first porous layer, third porous layer, and the permeate-side flow channel member;

wherein the sealant is vinyl chloride copolymer-based resins, vinyl chloride-vinyl acetate copolymer-based resins, vinyl chloride-vinylidene chloride copolymer-based resins, vinyl chloride-acrylonitrile copolymer-based resins, butadiene-acrylonitrile copolymer-based resins, polyamide-based resins, polyvinyl butyral-based resins, polyester-based resins, cellulose derivative-based resins, styrene-butadiene copolymer-based resins, synthetic rubber-based resins, phenol-based resins, urea-based resins, melamine-based resins, phenoxy-based resins, silicone-based resins, or urea formamide-based resins.

2. The gas separation membrane element according to claim 1, wherein the thermal expansion coefficient A and the thermal expansion coefficient B satisfy a relation (i):

$$0.35 \leq A/B \leq 1.0 \qquad (i).$$

3. The gas separation membrane element according to claim 1, wherein
the material forming the first porous layer includes at least one kind of resin selected from the group consisting of polyethylene (PE), polypropylene (PP), fluorine-containing resin, polystyrene (PS), polyethylene terephthalate (PET), polyethersulfone (PES), polyphenylene sulfide (PPS), polysulfone (PSF), polyimide (PI), polyetherimide (PEI), and polyetheretherketone (PEEK).

4. The gas separation membrane element according to claim 1, wherein
the gas separation membrane element is a spiral-wound gas separation membrane element further including a central tube in which the specific gas flowing in the permeate-side flow channel member is collected.

5. The gas separation membrane element according to claim 4, wherein
the sealing portion is provided at least in end portions located at respective opposite ends of the gas separation membrane in a direction parallel with an axis of the central tube, and
the cured material of the sealant has a Shore hardness of 60 or more.

6. The gas separation membrane element according to claim 1, wherein
the hydrophilic resin composition layer includes
a hydrophilic resin, and
a carrier reversibly reacting with the specific gas in the source gas.

7. The gas separation membrane element according to claim 1, wherein
the specific gas is an acid gas.

8. A gas separation membrane module comprising, in a housing, at least one gas separation membrane element as recited in claim 1.

9. A gas separation apparatus comprising at least one gas separation membrane module as recited in claim 8.

10. The gas separation membrane element according to claim 1, wherein a region, in which become the sealing portion in the first porous layer, is made hydrophilic using a surfactant.

11. A method for manufacturing a gas separation membrane element which separates a specific gas from a source gas containing the specific gas, the gas separation membrane element comprising:
a feed-side flow channel member to which the source gas is fed;
a gas separation membrane,
a permeate-side flow channel member in which the specific gas permeated through the gas separation membrane flows; and
a sealing portion for preventing mixture of the source gas and the specific gas permeated through the gas separation membrane,
the method comprising:
preparing the gas separation membrane including
a first porous layer including a porous membrane,
a hydrophilic resin composition layer selectively permeating the specific gas contained in the source gas, the hydrophilic resin composition layer being disposed directly on the first porous layer, and
a second porous layer including a porous membrane, the second porous layer being disposed directly on a surface of the hydrophilic resin composition layer opposite to the surface of the hydrophilic resin composition layer on which the first porous layer is provided;
the material forming the permeate-side flow channel member including at least one kind of material selected from the group consisting of polyethersulfone (PES), polysulfone (PSF), polyetheretherketone (PEEK), polyimide (PI), polyphenylene sulfide (PPS), and metals, and
forming the sealing portion by causing a sealant to be penetrated and cured in at least the first porous layer and the permeate-side flow channel member,
a thermal expansion coefficient A of the sealing portion and a thermal expansion coefficient B of a material forming the first porous layer satisfying a relation (I):

$$0.35 \leq A/B \leq 1.0 \qquad (I);$$

whereby the method comprises obtaining a laminate in which the acid gas separation membrane, the feed-side flow channel member, and the permeate-side flow channel member are laminated; and
(a) the gas separation membrane includes a third porous layer including a porous membrane,
(b) the third porous layer is disposed on a surface opposite to a surface of the first porous layer on which the hydrophilic resin composition layer is disposed, and between the first porous layer and the permeate-side flow channel member,
(c) the material forming the third porous layer includes at least one kind of material selected from the group consisting of fluorine-containing resins, polystyrene (PS), polyester resins, polyether sulfone (PES), polyphenylene sulfide (PPS), polysulfone (PSF), polyimide (PI), polyetherimide (PEI), polyether ether ketone (PEEK), high molecular weight polyester, heat resistant polyamide, aramid, polycarbonate, metals, glass, and ceramics, and
(d) the sealing portion is a region in which a cured material of a sealant penetrates in at least the first porous layer, third porous layer, and the permeate-side flow channel member
wherein the sealant is vinyl chloride copolymer-based resins, vinyl chloride-vinyl acetate copolymer-based resins, vinyl chloride-vinylidene chloride copolymer-based resins, vinyl chloride-acrylonitrile copolymer-based resins, butadiene-acrylonitrile copolymer-based resins, polyamide-based resins, polyvinyl butyral-based resins, polyester-based resins, cellulose derivative-based resins, styrene-butadiene copolymer-based resins, synthetic rubber-based resins, phenol-based resins, urea-based resins, melamine-based resins, phenoxy-based resins, silicone-based resins, or urea formamide-based resins.

12. The method for manufacturing a gas separation membrane element according to claim 11, wherein the thermal expansion coefficient A and the thermal expansion coefficient B satisfy a relation (i):

$$0.35 \leq A/B \leq 1.0 \tag{i}$$

13. The method for manufacturing a gas separation membrane element according to claim 11, wherein the sealant to be penetrated and cured in at least the first porous layer is made hydrophilic using a surfactant.

\* \* \* \* \*